US006037985A

United States Patent [19]
Wong

[11] Patent Number: 6,037,985
[45] Date of Patent: Mar. 14, 2000

[54] VIDEO COMPRESSION

[75] Inventor: Yiwan Wong, Plano, Tex.

[73] Assignee: Texas Instruments Incorporated, Dallas, Tex.

[21] Appl. No.: 08/960,700

[22] Filed: Oct. 30, 1997

Related U.S. Application Data

[60] Provisional application No. 60/029,229, Oct. 31, 1996.

[51] Int. Cl.[7] ............................. H04N 7/12; H04N 11/02; H04N 11/04
[52] U.S. Cl. ......................... 348/405; 348/414; 348/417; 348/422
[58] Field of Search ................................... 348/405, 414, 348/417, 419, 422, 470, 533; H04N 7/12, 11/02, 11/04

[56] References Cited

U.S. PATENT DOCUMENTS

| | | | |
|---|---|---|---|
| 4,811,398 | 3/1989 | Copperi et al. | 381/37 |
| 4,857,928 | 8/1989 | Gailus et al. | 341/143 |
| 5,134,482 | 7/1992 | Brummette et al. | 358/166 |
| 5,231,484 | 7/1993 | Gonzales | 348/405 |
| 5,347,310 | 9/1994 | Yamada et al. | 348/405 |
| 5,712,809 | 1/1998 | Girod et al. | 364/725 |
| 5,734,674 | 3/1998 | Fentone et al. | 375/207 |
| 5,960,003 | 9/1999 | Fischer et al. | 370/468 |

*Primary Examiner*—Vu Le
*Assistant Examiner*—Nhon T. Diep
*Attorney, Agent, or Firm*—Carlton H. Hoel; W. James Brady; Richard L. Donaldson

[57] ABSTRACT

A method (FIG. 1) of macroblock bit allocation in an MPEG picture encoding which assigns quantization facators according to macroblock quanfization noise immunity and subsequently adjusts quantization factors according to picture level total encoded bit target. Further reassignment of macroblock bits from high PSNR to low PSNR macroblocks.

6 Claims, 7 Drawing Sheets

| SEQUENCE | PSNR Y | Cb | Cr | COMPARE TO TM5-STEP 3 | | |
|---|---|---|---|---|---|---|
| PLAYOFF | 36.241 | 43.203 | 42.216 | +1.454 | +0.600 | +0.737 |
| FLOWER GARDEN | 28.501 | 32.165 | 33.618 | +0.518 | +0.130 | +0.663 |
| MOBILE AND CALENDER | 27.868 | 31.750 | 31.489 | +0.670 | +0.280 | +0.372 |
| CHEERLEADER | 28.047 | 29.730 | 31.184 | +0.347 | +0.357 | +0.281 |
| TABLE TENNIS | 35.894 | 41.697 | 40.845 | +1.265 | +1.369 | +1.098 |
| BICYCLE | 28.492 | 33.425 | 34.330 | +0.470 | +0.160 | +0.254 |
| FOOTBALL | 35.419 | 38.458 | 39.973 | +0.644 | +0.752 | +0.620 |

| SEQUENCE | PSNR Y | Cb | Cr | COMPARE TO TM5-STEP 3 | | |
|---|---|---|---|---|---|---|
| PLAYOFF | 32.892 | 41.204 | 39.699 | +0.875 | +0.247 | +0.332 |
| MOBILE AND CALENDER | 25.188 | 30.140 | 29.730 | +0.399 | +0.494 | +0.529 |
| TABLE TENNIS | 33.178 | 40.051 | 38.887 | +1.136 | +1.079 | +0.636 |
| CHEERLEADER | 25.413 | 27.602 | 29.277 | +0.136 | +0.301 | +0.184 |

VIDEO COMPRESSION

This application claims priority under 35 USC § 119(e)(1) of provisional application Ser. No. 60/029,229, filed Oct. 31, 1996.

BACKGROUND OF THE INVENTION

The invention relates to video compression, and, more particularly, to motion picture experts group (MPEG) video compression.

Video communication (television, teleconferencing, and so forth) typically transmits a stream of video frames (pictures) along with audio over a transmission channel for real time viewing and listening by a receiver. However, transmission channels frequently add corrupting noise and have limited bandwidth (e.g., television channels limited to 6 MHz). Consequently, digital video transmission with compression enjoys widespread use. In particular, various standards for compression of digital video have emerged and include H. 261, MPEG-1, and MPEG-2, with more to follow, including in development H.263 and MPEG4. There are similar audio compression methods such as CELP and MELP.

Tekalp, Digital Video Processing (Prentice Hall 1995), Clarke, Digital Compression of Still Images and Video (Academic Press 1995), and Schafer et al, Digital Video Coding Standards and Their Role in Video Communications, 83 Proc. IEEE 907 (1995), include summaries of various compression methods, including descriptions of the H.261, MPEG-1, and MPEG-2 standards plus the H.263 recommendations and indications of the desired finctionalities of MPEG-4. These references and all other references cited are hereby incorporated by reference.

H.261 compression uses interframe prediction to reduce temporal redundancy and discrete cosine transform (DCT) on a block level together with coefficient quantization plus high spatial frequency cutoff to reduce spatial redundancy. H.261 is recommended for use with transmission rates in multiples of 64 Kbps (kilobits per second) to 2 Mbps (megabits per second).

The H.263 recommendation is analogous to H.261 but for bitrates of about 22 Kbps (twisted pair telephone wire compatible) and with motion estimation at half-pixel accuracy (which eliminates the need for loop filtering available in H.261) and overlapped motion compensation to obtain a denser motion field (set of motion vectors) at the expense of more computation and adaptive switching between motion compensation with 8 pixel by 8 pixel blocks and macroblocks (four 8 by 8 luminance blocks plus spatially associated chroma blocks).

MPEG-1 and MPEG-2 also use temporal prediction followed by two dimensional DCT transformation on a block level similar to H261, but they make further use of various combinations of motion-compensated prediction, interpolation, and intraframe coding. MPEG-1 aims at video CDs and works well at rates about 1–1.5 Mbps for frames of about 360 pixels by 240 lines and 24–30 frames per second. MPEG-1 defines I, P, and B pictures with I pictures intraframe, P pictures coded using motion-compensation prediction from previous I or P pictures, and B pictures using motion-compensated bi-directional prediction/interpolation from adjacent I and P pictures. FIG. 2 indicates the prediction within a group of consecutive pictures (GOP).

MPEG-2 aims at digital television (720 pixels by 480 lines) and typically uses bitrates up to about 10 Mbps with MPEG-1 type motion compensation with I, P, and B pictures plus adds scalability (a lower bitrate may be extracted to transmit a lower resolution image).

The number of bits per picture in a MPEG video bit stream is variable, so a rate control strategy is needed in the encoder to regulate the bit rate so that a constant-size buffer in the decoder can receive the bitstream through a fixed rate channel without overflow or underflow. The basic function of such a rate control scheme is to dynamically regulate the coding parameters so as to match the number of coded bits with the channel capacity available. In MPEG, rate control is achieved through the manipulation of a macroblock-level (MB-level) coding parameter called quantization scale (Q or MQUANT). This parameter, which takes any integer value in the range 1 to 31 (or an alternative set of integers and half integers from 0.5 to 56), is used for scaling the quantization matrix of the DCT representation of either the MB or its pixel-difference with a predicted MB, depending upon the selected MB coding type. FIG. 3a illustrates functional blocks for an encoder and a decoder; these may be implemented in digital signal processors or general processors with sufficient computational power. For the 8-bit levels and an 8 by 8 block, the DCT coefficients will have values in the range from −2048 to +2047. FIG. 3b shows the default intra quantization matrix with the dc coefficient in the upper lefthand corner; that is, a DCT coefficient is divided by the corresponding matrix entry and Q and then rounded-off to the nearest integer. A high Q will reduce the number of bits needed to code the MB at the expense of degradation in the quality of the reconstructed MB, and vice versa. Hence, the technique used to adjust Q has a direct effect on the resultant quality of the encoded picture. Ideally, the value of Q for each MB should be selected so that good and stable picture quality is attained and the buffer capacity constraint is observed.

The MPEG test model encoder (TM5) performs rate control via bit assignment at two hierarchical levels (or layers) of a bitstream: the picture-level and the MB-level. Prior to coding a picture, the encoder uses statistics obtained form coding a previous picture of the same type (i.e., I, P, or B) and the number of bits available for coding the remaining pictures in the current group of pictures (GOP) to determine the target number of bits to be used to code the current picture. Hence, the number of bits to code a picture is set a priori without looking at the content of the picture. At the MB-level the value of Q is set on-the-fly by the product of two parameters: a reference Q which depends upon the fullness of the virtual buffer just prior to coding the MB, and a scaling factor which varies from 0.5 to 2.0 according to the value of the MB's spatial activity (measured by pixel variance) with respect to the average activity of the MBs in the previously encoded picture. Because MBs are coded in scan-line order, the encoder has no knowledge of the complexity of the yet-to-be coded MBs. Therefore, in order to observe the picture-level bit assignment, each MB is assigned the same number of bits up front, and the aggregate difference between the number of bits asigned and actually used will then determine the virtual buffer fullness (and hence the value of the reference Q).

There are two fundamental problems with this rate control scheme. First, because TM5 assumes almost equal numbers of bits per GOP, when there is a scene change occurring at a non-intra picture (i.e., a P or B picture) within a GOP, the coded quality will drop substantially because scene change normally requires a lot more bits to code than that designated by the a priori picture-level bit assignment for predictive pictures, in order to maintain a resonable quality. Second, because each MB within a picture is assigned equal numbers of bits up front and because MBs are processed in scan-line order, the rate control scheme cannot take advantage of the variation in coding complexity within a picture when assigning the value of Q, possibly resulting in large quality variations within a picture. Moreover, the reference Q values are set solely based on the buffer fullness constraint without regarde to the actual picture content in the MB. This is undesirable since it is well known that there is a strong relationship between the occurrence of quantization noise and the features displayed by pixels in a MB. Although TM5-step3 also utilizes a variance-dependent scaling factor to partially circumvent this shortcoming, its effectiveness is limited.

SUMMARY OF THE INVENTION

The present invention provides macroblock-level (MB-level) bit allocation using a tradeoff of picture average quality and local distortion within the picture. Local distortion is measured by quantization noise immunity and average picture quality by the peak signal to noise ratio (PSNR). Preferred embodiments use three passes through a picture to adjust the MB quantization scales to utilize the encoding bits allocated to the picture.

The MB-level bit allocation scheme has the advantages of not requiring an excessive amount of storage as in a generalized multipass picture analysis step and yet producing a picture of high average visual quality with little visible local distortion.

BRIEF DESCRIPTION OF THE DRAWINGS

The drawings are schematic for clarity.

DESCRIPTION OF THE PREFERRED EMBODIMENTS

Overview of Preferred Embodiments

The preferred embodiment methods of macroblock-level (MB-level) bit allocation is a multipass compromise between the singlepass bit allocation of MPEG test model TM5 and a general multipass approach which typically would be too costly in terms of storage and computation cost to be practical. In particular, the preferred embodiments limit look-ahead to just within a picture, that is, the encoder is allowed to process the MBs within a picture (typically 1320 MBs per NTSC TV format picture) in scan-line order a multiple number of times to select the best set of quantization scales (Qs) for the MBs using the peak-signal-to-noise ratio (PSNR) and measurement of immunity to quantization noise as described in the following.

A commonly used criterion for measuring the quality of a reconstructed picture is the PSNR which reflects the average distance between corresponding pixels in the original, p(i,j), and the reconstructed picture, p'(i,j), where the pixels are 8-bits (0–255) and only the luminance pixels are used:

$$PSNR = 20\log 255 - 10\log \{\Sigma[p(i,j)-p'(i,j)]^2/NM\}$$

with the sum over all pixels in the picture, N is the number of rows of pixels and M the number of columns of pixels in the picture. PSNR is similarly defined for a MB with N=M=16. While the PSNR measure provides a feel of the goodness of the decoded picture in an average sense, it is also well known that the human visual system is more sensitive to local distortion than average qualtiy. Hence, maximizing the PSNR measurement alone may not guarantee good perceptual quality. The preferred embodiment multipass assignment technique attempts to strike a balance between the average quality (PSNR measurement) and local distortion by taking both aspects into account when performing MB-level bit allocation.

Figure 1:
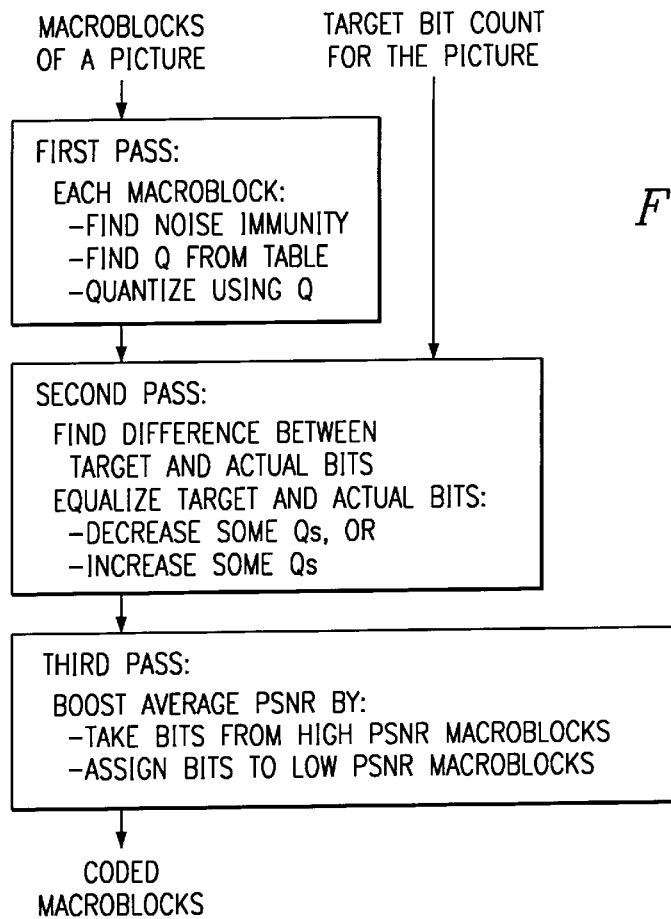
FIG. 1 is a flow diagram for a preferred embodiment.
Figure 2:
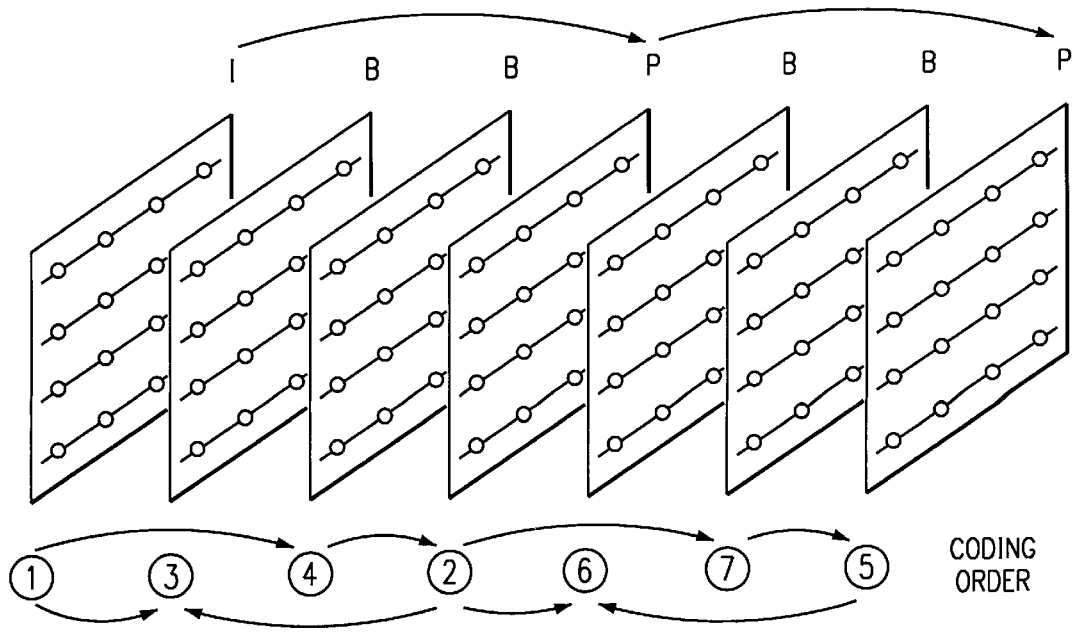
FIG. 2 illustrates a group of pictures in MPEG.
Figures 3A, 3B:
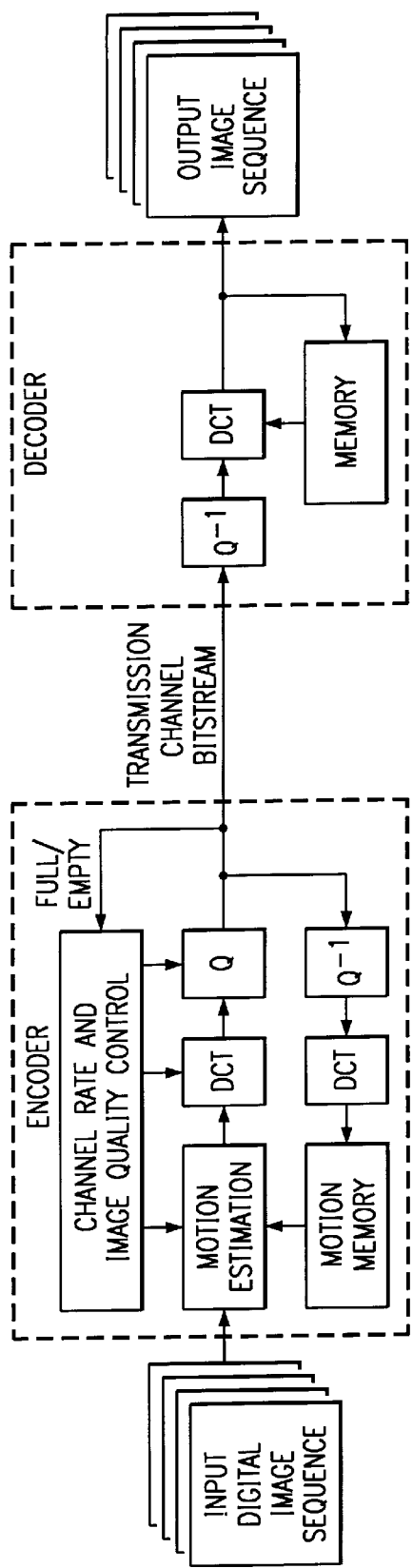
FIGS. 3a–b shows a MPEG encoding/decoding and default quantization matrix.

The preferred embodiments process each picture in three passes to find the set of Q values for the MBs in the picture. It is assumed that prior to the first pass that the picture-level bit assignment step has determined the proper number of bits to be used to encode the picture. The first pass uses pixel gradients to determine the immunity of a MB's content to quantization noise. This degree of immunity will then be used to define the Q values for quantizing the MBs during first pass. The second pass adjusts the bit count obtained from the first pass to meet the target bit count specified by the picture-level bit assignment. This is done by distributing the difference (residual) between the target and the actually used bit counts to the MBs. A positive residual means that more bits are available for coding the MBs and therefore the value of some Qs obtained from the first pass can be lowered, while a negative residual implies that bit count of some MBs has to be lowered by raising their Q values. A model which maps the change in Q with change in bit count (called Q2nbit) is used to determine the new Q values according to the distribution of the residuals. Actual additional number of bits spent or saved will be obtained from quantizing the MBs with the new values of Q. At the end of this second pass, the total number of bits used should be in the neighborhood of the target bit count set by the picture-level bit assignment. The third and final pass will attempt to improve the overall PSNR of the whole picture while keeping the change in overall bit count to a minimum. This is accomplished by talking bits away from MBs which have high PSNR and allocating these saved bits to MBs with the lowest PSNR. The number of bits which can be taken away from the high PSNR MBs are estimated from using the same Q2nbit model used in the second pass. This final pass also generates the encoded bit stream. FIG. 1 summarizes the preferred embodiment three-pass bit assignments.

Preferred Embodiment First Pass

The preferred embodiment first pass aims at finding an initial MB-level bit allocation according to the sensitivity of the picture content to quantization noise rather than buffer fullness. That is, assigning lower Q values to MBs which are more prone to quantization noise and higher Q values to others which have less potential of visible quantization noise. This approach will reduce the amount of quantization artifacts at the expense of bit count. Obviously, if care is not taken, then all MBs will be assigned the lowest possible Q value that will result in the least amount of quantization artifacts but also consume far too many bits than desired. Hence, the objective of the first pass is to generate an initial MB-level bit allocation with "reasonable" bit count while minimizing the most visible quantization artifacts. Subsequent passes will then readjust this bit allocation to observe the target picture-level bit count.

Figure 4:
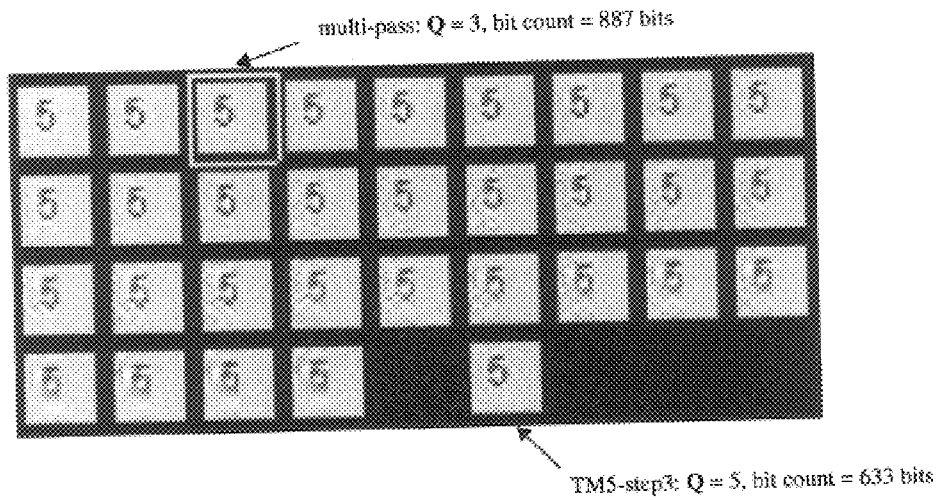
FIGS. 4–5 illustrate effects of different quantization scales.

A common quantization noise artifact in MPEG video encoding is the so-called ringing or mosquito noise which occurs most frequently around strong edges in a smooth background. For example, area surrounding the dark numerals on the white-background sliding calendar in some of the scenes in the standard Mobile & Calendar (M&C) MPEG test sequence. Because a sharp transition in the spatial domain corresponds to many high frequency components in the spectral (DCT) domain, using a high Q value which annihilates most of these high freqeuency components will render the edge transition blurred. Furthermore, because the background is smooth, residual frequency components from such a sharp edge will clearly show up near to the edge as noise artifacts. FIG. 4 shows the effect of quantization on such an MB taken from the M&C sequence. It can be observed that when the value of Q increases beyond 4, the amount of visible quantization noise artifacts increases rapidly and then levels off.

Figure 5:
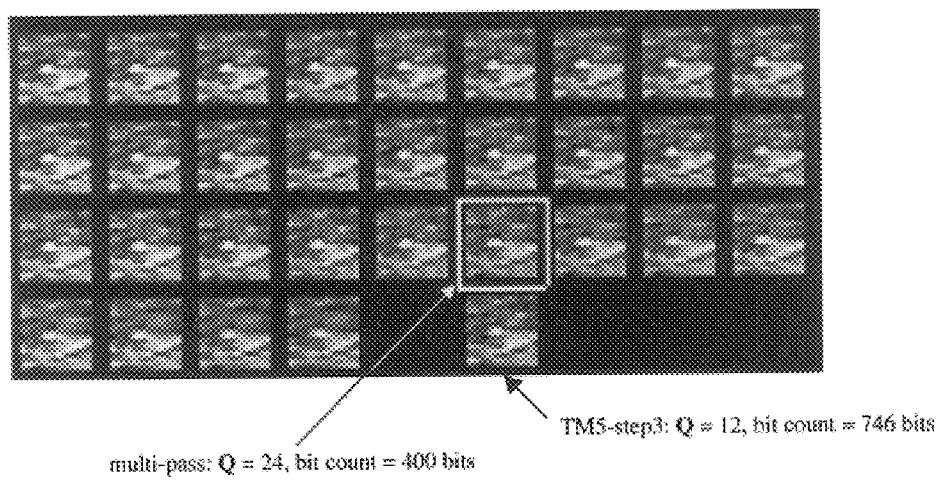

On the other hand, MBs with complex content such as those in the flower bed area of the Flower Garden (FG) MPEG test sequence are less susceptible to visible ringing noise because any such artifacts will be concealed by the complexity of the scene. In such case, higher Q values are acceptable. FIG. 5 shows such an MB taken from the FG sequence subject to quantization with different Q values. The immunity of this MB to visible noise artifact is obvious.

First pass of the MB-level bit allocation scheme exploits the relationship between content of the MBs and the visibility of quantization noise by setting the Q value according to the noise immunity of the MBs. Noise immunity of an MB is derived from the gradient of its pixels. The Sobel operators are used to compute the partial derivatives (finite differences) $g_X(i,j)$ and $g_Y(i,j)$ of a pixel p(i,j) in the horizontal and vertical directions, and the sum of the absolute values of these two values is taken as the gradient, G(i,j), at pixel p(i,j):

$$g_X(i,j)=p(i+1,j-1)+2p(i+1,j)+p(i+1,j+1)-[p(i-1,j-1)+2p(i-1,j)+p(i-1,j+1)]$$

$$g_Y(i,j)=p(i-1,j+1)+2p(i,j+1)+p(i+1,j+1)-[p(i-1,j1)+2p(i,j-1)+p(i+1,j-1)]$$

Figure 6:
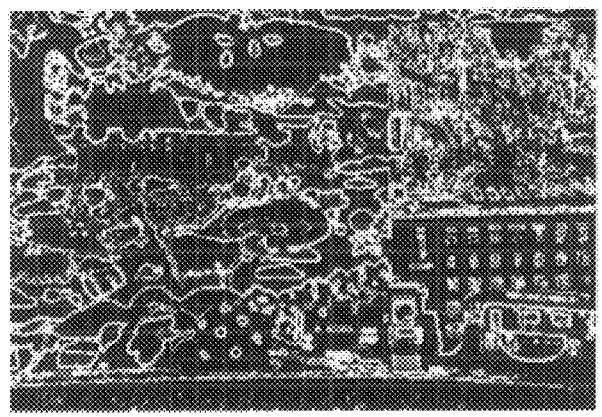
FIG. 6 shows edge pixels in a picture.

Unlike pixel variance which only shows the variance of individual pixels with respect to the mean pixel value, the gradient indicates the contrast/variation of the pixel values in a local 3-by-3 neighborhood of each pixel, thus providing information about the "look" of the MB as a whole. An 8-bit pixel (values in range 0 to 255) is called an edge pixel if its gradient value is greater than 255, otherwise it is called a non-edge pixel. The edge pixels are those which show large contrast with their neighboring pixels and these have a high probability of being on a strong edge in the picture. The non-edge pixels, on the other hand, are those which may form a smooth background in an MB; see FIG. 6. The immunity of an MB (16 by 16 luminance only) to quantization noise is defined with the gradient value of its pixels with the formula $$qnoise\_immunity=(\Sigma_{non-edge}G(i,j)num\_non\_edge)(256/num\_non\_edge)$$

where the sum is over the non-edge pixels and num__non__edge is the number of non-edge pixels in the MB. The first factor represents the smoothness of the background of the MB, the smaller this factor is the smoother is the background. The second factor denotes the inverse of the significance of smoothness of the background area, the larger this factor is the less significant is the background smoothness. An MB with strong edge and a significantly smooth backgound will have a low qnoise__immunity. For example, the MB shown in FIG. 4 has a qnoise__immnity of 39; on the other hand, for complex MBs such as the one shown in FIG. 5, since num__non__edge is small, the qnoise__immunity is relatively larger (equals 434). Therefore, an MB with low qnoise__immunity should be assigned a low value of Q and an MB with high qnoise__immunity may be assigned a high Q value.

Figure 7:
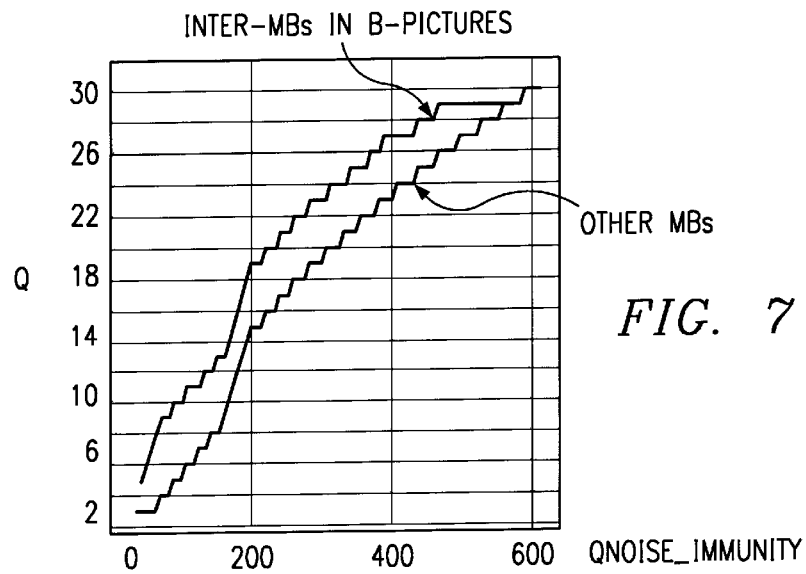
FIG. 7 is the first preferred embodiment relation between quantization scale and quantization noise immunity.

Mapping of qnoise__immunity to a value for Q is done via a lookup table. Two tables are provided, one for intra-coded MBs and inter-oded MBs in P-pictures; and the other table for inter-coded MBs in B-pictures. FIG. 7 shows the two tables. The first pass uses these values of Q to quantize the MBs in the picture and determine the number of bits used by each MB. The PSNR value of each MB is also computed (rounded down to the nearest integer and clipped to an 18 to 49 dB range) in preparation for the second pass.

Preferred Embodiment Second Pass

The MB-level bit allocation done in the first pass does not take the target picture-level bit count into consideration and hence descrepancy may exist between the target bit count and the first pass actual overall bit count. Let Residual be the difference between the number of target bits and the number of used bits. If Residual is positive, then this quantity represents the number of surplus bits available for coding the picture and hence the bit count of some MBs can be increased. On the other hand, a negative Residual value is the number of deficit bits which need to be taken from the bit count of some of the MBs. The second pass readjusts the values of Q obtained from the first pass to reduce or increase the bit counts of the MBs to meet the target. MBs are grouped either according to their PSNR values (rounded down to the nearest integer and clipped to the range 18 to 49 dB) or Q values (integer from 1 to 31) depending upon whether the Residual is positive or negative, respectively. Readjustment of Q is then performed with two operations. First, the Residual bits are distribued to these groups of MBs; then, MBs are processed in the scan-line order to readjust the Q (bit counts) according to the Residual distribution described in the following paragraphs. At the end of the second pass, MB-level PSNR and overall PSNR are computed. MBs are then grouped according to their PSNR values for third pass processing.

If the Residual value is positive, the residual bits are distributed to the PSNR groups in proportion to the product of the number of MBs in a group and a weighting factor which depends upon the PSNR value. Let w(i) and N(i) be the weight factor of and the number of MBs in the ith PSNR group, respectively. Then, the number of residual bits assigned to this group, rbit(i), is given by $$rbit(i)=w(i)N(i)Residual/\Sigma_j w(J)N(J)$$

Figure 8:
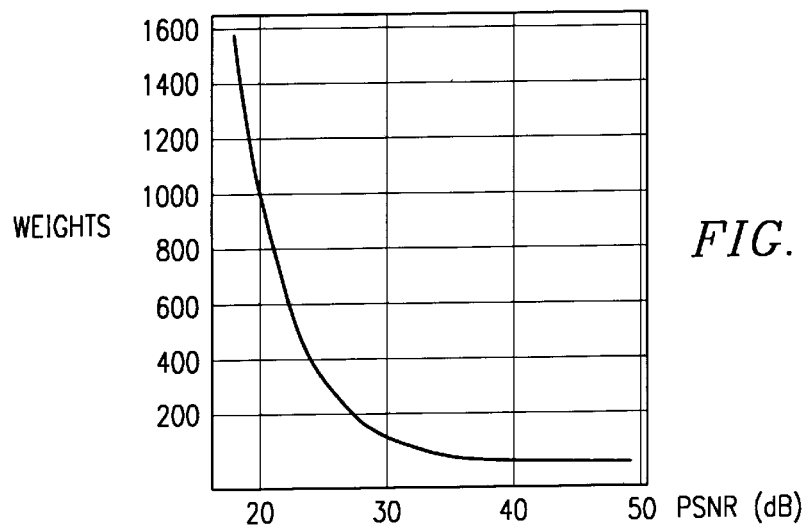
FIG. 8 graphs the first preferred embodiment macroblock group weightings as a function of PSNR.

The weighting function (shown in FIG. 8) is an exponential decay that gives heavier weight to groups with lower PSNR in order to improve the overall PSNR of the whole picture. This strategy is based on the observation that if $S_K$ denotes $$S_K=20 \log 255-10 \log \{\Sigma[p(i,j)-p'(i,j)]^2/256\}$$

where the summation is over the 256 luminance pixels of the kth MB, then the sum of the square of pixel differences of the MB is $$\Sigma_{p(i,j) \in MBk}[p(i,j)-p'(i,j)]^2 = d_k = 256(255/10^{Sk/20})^2$$

and hence the PSNR of the picture can be expressed as $$PSNR = 20\log 255 - 10\log\left[\sum d_K / NM\right]$$
$$= 10\log[NM/256 \sum 10^{-Sk/10}]$$

Because a small $S_K$ contributes significantly more to the denominator value in the quotient than a larger $S_K$, it is much more beneficial to the overall PSNR value if a larger portion of the available surplus bits is spent on MBs that have low PSNR (i.e., improving the low value $S_K$) than on those that already have high PSNR values. And the allocation of rbit(i) bits among the N(i) MBs in the ith group accomplishes this as detailed in the following paragraphs.

Figure 9:
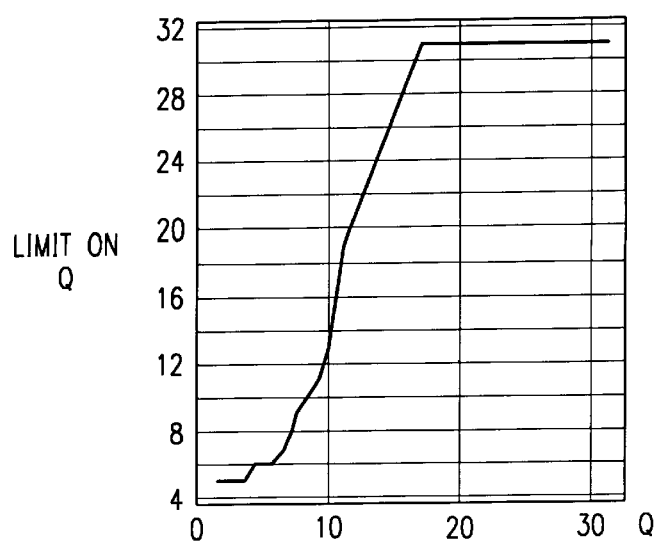
FIG. 9 shows the first preferred embodiment relation between limiting quantization scale during recursion.

On the other hand, when the Residual value is negative, the (deficit) residual bits are distributed to the MBs which have been grouped by their values of Q. MBs in the lower Q groups are those which are less immune to quantization noise artifacts and therefore less (deficit) bits should be assigned to these groups. The deficit bits are assigned in a round-robin fashion where each MB group has a pre-defined limiting value to which its Q value can be raised to. The Q2nbits function (discussed in the following) is then employed to estimate the number of bits that can be saved by raising the value of Q of each group by one until all groups have reached their respective limiting values or until the estimated number of saved bits exceeds the number of deficit bits. The limiting value of all groups will be raised one by one and the whole process repeated if deficit bits remain at the end of one round-robin assignment. The set of initial limiting values on Q used by the second pass is shown in FIG. 9. As can be noted, groups with lower Q value are allowed smaller limiting values to preserve the visual quality.

After distributing the residual bits to the groups, MBs in the picture are processed in the normal scan-line order. An MB in the ith group is allocated a fair share of rbit(i), the size of which is determined by the ratio of the first pass bit count of this MB to the sum of first pass bit counts of all the yet-to-be processed MBs in the ith group. If the allocation portion is zero sized then the MB will be quantized with the same Q as in the first pass. Else, the value of Q from the first pass will be adjusted so that bit count of the MB is increased or decreased by the designated fair share amount.

Figure 10A:
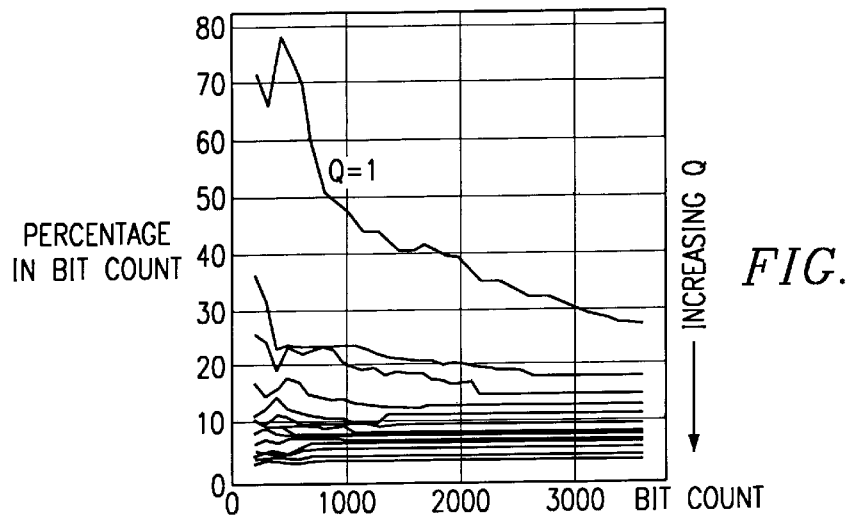
FIG. 10 illustrates bit count as a function of quantization scale.
Figure 10B:
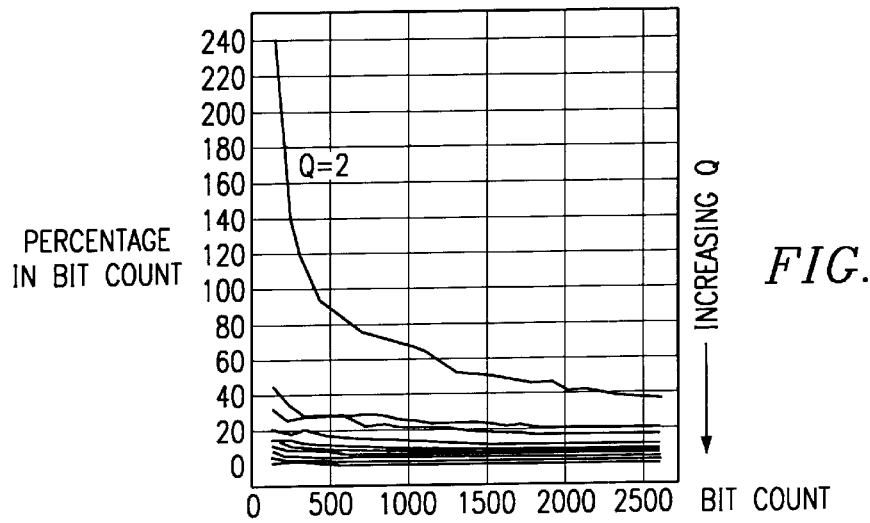

To successilly adjust the quantizer scale Q of an MB to achieve the designated increment or decrement in bit count, it is necessary to know how the bit count of an MB varies with different Q values. However, since the quantization and variable length coding used by MPEG are nonlinear, it is difficult to determine precisely the number of bits required to code an MB at a certain Q value without going through the quantization and coding steps. Instead of the precise value, the second pass opts for a bit count estimation model, called Q2nbit, which provides an estimate of the percentage change in bit count when the quantizer scale Q changes by a unit step. The premise of this model is that MBs that have similar bit counts under the same Q have similar complexity and, when Q changes by a unit step, the percentage change in their bit counts will be similar. FIG. 10 shows plots of the percentage change in bit count versus original bit count used in the Q2nbit model. Training sequences were used to generate this data.

Test runs showed that the Q2nbit model is quite reliable except in the cases where the Q value of MBs with low bit counts (less than 100) are to be decreased to raise the bit counts to specific targets. In these cases, the change in bit counts is modeled by a separate piecewise linear model which can be described by the following recursive relationships:

$$Q_{k+1}=\max(Q_k-\Delta nbit(k)/step(k), Qlimit(k))$$

$$\Delta nbit(k+1)=\Delta nbit(k)-(Q_{k+1}-Q_k)step(k)$$

where $Q_0$ is the Q value from the first pass, and $\Delta nbit(0)$ is the difference between the target bit count and the bit count from quantizing the MB with $Q_0$. The values of Qlimit(k) and step(k) for k=0, 1, . . . , 4 are Qlimit={21, 17, 10, 5, 2} step={8, 15, 40, 70, 100}

Figure 11:
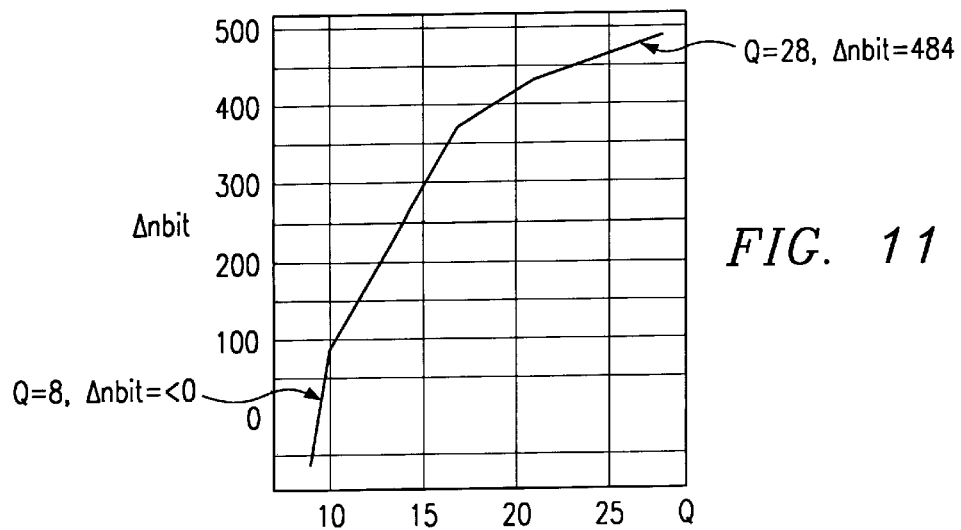
FIG. 11 shows the first preferred embodiment relation between differential bit count and quantization scale.

The recursion stops as soon as there is no change to $Q_{K+1}$ or its value reaches 1. FIG. 11 shows an example of the piecewise linear paths taken to reach a target bit count using this model.

Figures 12, 13:
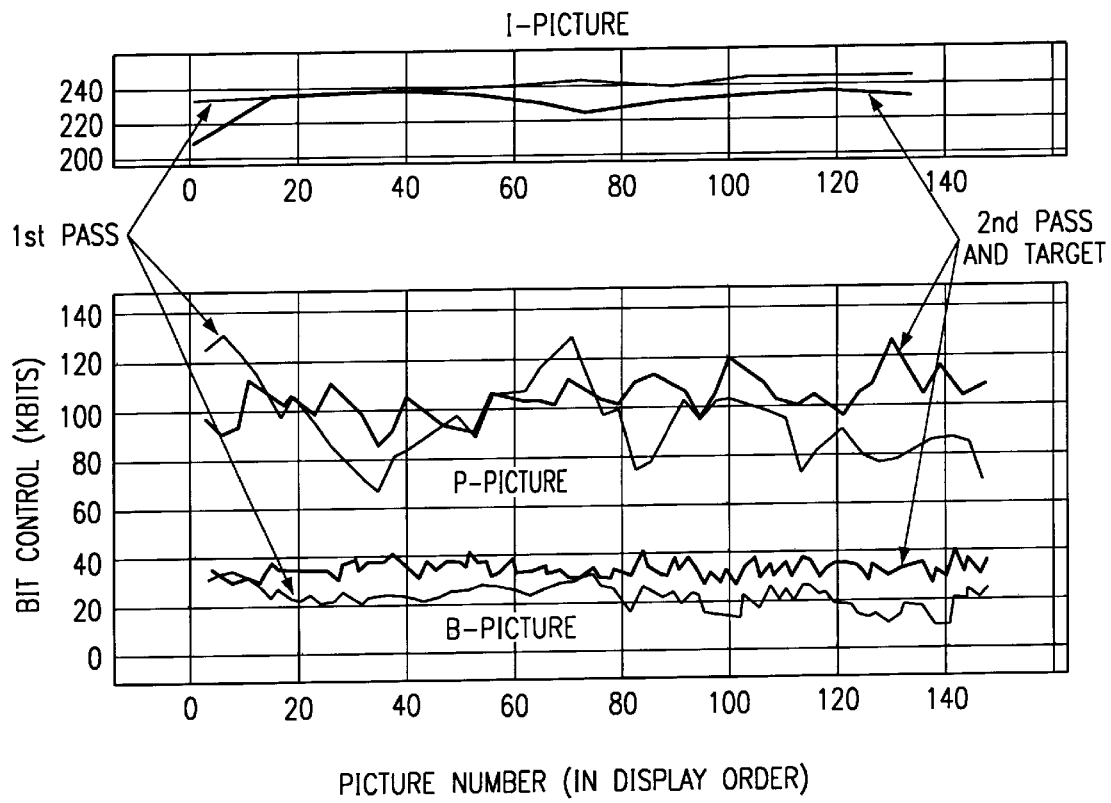
FIGS. 12–15 indicate test results of the first preferred embodiment.

For each MB that has been assigned a nonzero adjustment, the Q2nbit model or the piecewise linear model will be used to determine the new value of Q which will consume or save the number of bits required. Since this model is only an approximation, it is necessary to use this newly found Q value to quantize the MB and determine the actual change in bit count. The actual number of bits saved/spent will then be deducted from the value of rbit(.) of the group to which the MB belongs. FIG. 12 shows the bit count of the I, P, and B pictures in the M&C sequence (2.0 Mbps) after the first and second passes, as well as the target bit count set by T5-step 3. As can be noted, the quantization scale readjustment step used in this second step is pretty successful in increasing or decreasing the overall picture-level bit count to the desired values. The differences in bit counts between the targets and those from the second pass are relatively small.

Preferred Embodiment Third Pass

It is possible to equalize the overall quality of the picture (improve the overall PSNR) by redistributing the bits assigned to different PSNR groups: bits are taken from MBs in high PSNR groups and assign to MBs of the lower PSNR groups. As explained in the foregoing second pass section, to improve the overall PSNR, it is desirable to boost the PSNR value of the MBs (called Recipients) in the lower PSNR groups, even if it is necessary to decrease the PSNR of some MBs (called Donors) in the higher PSNR groups. However, in order not to over-degrade the quality of MBs in the high PSNR groups, a conservative selection process is used to identify the Donors.

Let psnr_target be the overall PSNR value from the second pass plus 2.0 dB. Furthermore, let Q_target be the median Q value fro the MBs in the PSNR group with PSNR value equals psnr_target. An MB is selected as a Donor if its PSNR value is at least psnr_target, its Q value from the second pass is strictly less than Qtarget, and its bit count from the second pass is at least 100. The Q2nbit model will be applied to such MBs to determine the amount of saving that can be obtained by increasing their Q values from those assigned in the second pass to Qtarget. The total number of bits so obtained forms an estimate of the amount of bits that can be redistributed to the Recipient MBs. It is assumed that each Recipient MB will require at least 300 bits to improve its PSNR value significantly. The estimated amount of bits available from the Donors thus determines which of the low PSNR groups will be eligible to share the bits. Distribution of these bits to the eligible low PSNR groups will be done in the same way as in the second pass when there is a positive Residual.

Once the estimated available bits have been distributed to the needed groups, the MBs will be processed in scan-line order. MBs which belong to PSNR groups that have been assigned redistributed bits will be handled in a similar way as in the second pass: fair share of the surplus bits by the MBs will be determined and new Qs will be found through the use of the Q2nbit model. MBs which were designated as Donor will have their Q values set to that of Q_target and the actual number of bits saved will be noted. Other MBs will retain their Q values assigned by the second pass. Any discrepancy between the final number of bits used and the number of bits saved at the end of this third pass will be taken care of by the following picture to be coded. From test statistics, the magnitude of such discrepancies (positive or negative) were relatively small, for example, less than a few hundred bits per picture at a 2.0 Mbps bit rate.

Test Results

Figures 14, 15:
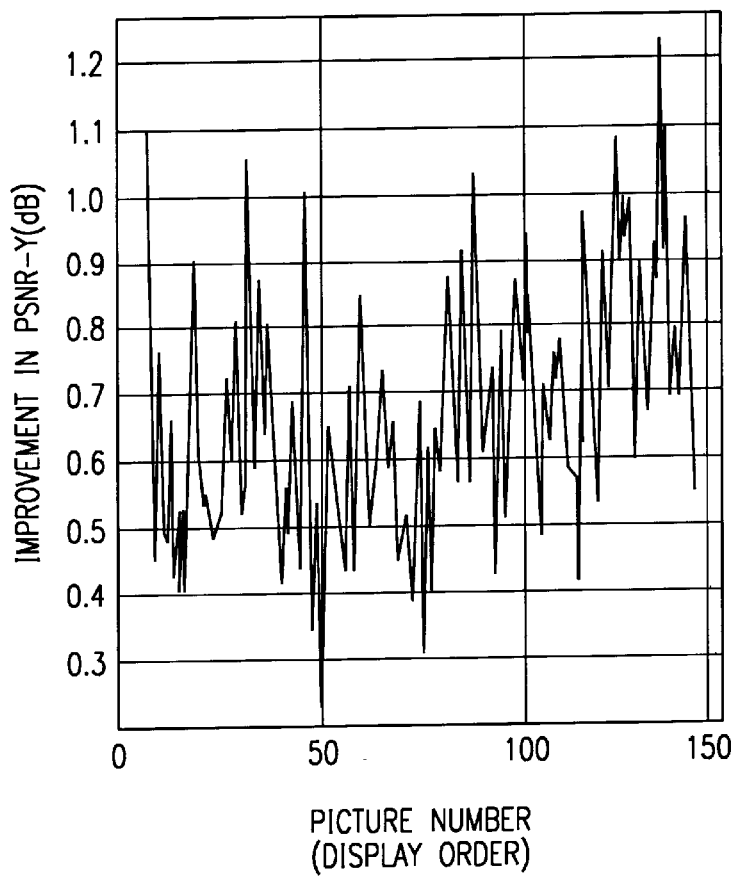

The preferred embodiment multipass MB-level bit allocation method was implemented and tested against standard MPEG-1 encoding with TM5-step3 rate control. Difficult test sequences from MPEG and other sources were teseted at 2.0 Mbps as well as 1.2 Mbps. Picture-level bit allocations were taken from that of TM5-step3 encoding in order to provide a fair assessment of the performance of the preferred embodiment MB-level bit allocation technique alone. FIG. 13 shows the average PSNR over 150 pictures for some of the test sequences. It can be noted from the results that at 2.0 Mbps, the multipass bit allocation method out-performs TM5-step3 in all the test cases. FIG. 13 shows the improvement in average PSNR-Y value over TM5 step3 in all the test cases. Substantial PSNR gains of more than 1.0 dB were observed for some of the less complex sequences. FIG. 14 shows the improvement in the per picture PSNR-Y value over TM5-step3 for the M&C sequence coded at 2.0 Mbps using the preferred embodiment multipass technique. It can be noted that the multipass technique consistently outperforms TM5step3 at every single picture.

The magnitude of the PSNR gain depends on the complexity of the sequences as well as the bit rate at which they are to be coded at. For example, FIG. 15 shows the PSNR gains of some of the test sequences when the bit rate is lowered to 1.2 Mbps. For sequences such as Table Tennis and Playoff, the 1.2 Mbps bit rate is sufficient to code the scene with reasonable quality and therefore the preferred embodiment multipass method was able to manipulate the MB-level bit assignment to improve the PSNR values. However, for complex sequences like Mobile & Calendar and Cheerleader, the achievable quality is limited by the bit rate and thus the multipass bit assignment method can only improve the PSNR slightly.

Modifications

The preferred embodiments may be varied in various ways while retaining one or more of the features of two or more passes for MB quantization scale determination with local distortion and optionally also average picture quality determinants.

For example, in the first pass the quantization noise immunity measurement formula could be extended to also cover the blocking effect, which is another kind of visual artifact commonly seen in compressed video. This can be achieved by introducing to the formula a term which relates to the relative complexity of abutting macroblocks. Adjacent macroblocks which have similar complexity and smooth background are more prone to blocking effect when quantized unevenly.

Furthermore, the mapping between quantization noise immunity measurement and the quantizer scale (FIG. 7) could be dynamically modified or refined according to the nature of the picture sequence being encoded, provided that the general positive sloping shape is retained. Indeed, the quantization noise immunity measurement formula could use a different gradient measurement, including curvature of higher derivative terms, or a different definition of edge pixel such as a larger or smaller threshold for the gradient.

In the second pass, the formula rbit(.) which controls the distribution of the (positive) residual bits to the MBs in the PSNR groups could have its weighting curve (FIG. 8) varied, provided the downward slope is maintained to improve overall PSNR. More generally, rbit(.) could be replaced with a nonlinear mapping which varies with the population statistics of the groups.

Similarly, in the second pass the limiting Q values defined in FIG. 9 for determining the distribution of the deficit bits (negative Residual) to the MBs in the Q-groups can also be redefined to change dynamically according to the population statistics of the Q-groups.

More generally, the second pass Residual bit distribution cold use Q value groups for both positive and negative Residual cases with curves such as Q2nbit in FIG. 10.

In the third pass, the distance between the target PSNR value from the average PSNR value can be MB-content-dependent (for example, based on noise immunity measure) instead of being fixed at 2.0 dB. The target Q can likewise be defined to be content dependent instead of fixed. In case computation loading is a concern, the third pass can also be omitted at the expense of some degradation in average video quality.

What is claimed is:

1. A method of encoding a picture, comprising the steps of:
   (a) providing macroblocks of a picture;
   (b) assigning a quantization factor to each of said macroblocks according to quantization noise immunity of said macroblock;
   (c) encoding each of said macroblocks according to its said quantization factor; and
   (d) adjusting said quantization factors according to the difference between a target number of bits for encoding said picture and the total number of bits used for said encoding in step (c).

2. A method of encoding a picture, comprising the steps of:
   (a) providing macroblocks MB1, MB2, . . . MBn, where n is a positive integer, constituting a picture;
   (b) assigning quantization factors Qj to said MBj according to quantization noise immunity of said MBj for each j in the range of 1 to n;
   (c) encoding said MBj according to Qj for each j in the range 1 to n; and
   (d) adjusting said Qj according to the difference between a target number of bits for encoding said picture and the total number of bits used for said encodings in step (c).

3. The method of claim 1, wherein:
   (a) said quantization noise immunity is measured using gradients.

4. The method of claim 1, wherein:
   (a) said adjusting when the quantization factor is to be increased uses a classification of said macroblocks differing from a classification used when the quantization factor is to be decreased.

5. The method of claim 2, wherein:
   (a) said quantization noise immunity is measured using gradients.

6. The method of claim 2, wherein:
   (a) said adjusting when the quantization factor is to be increased uses a classification of said macroblocks differing from a classification used when the quantization factor is to be decreased.

* * * * *